US012340285B2

(12) United States Patent
Kundu et al.

(10) Patent No.: US 12,340,285 B2
(45) Date of Patent: Jun. 24, 2025

(54) TESTING MODELS IN DATA PIPELINE

(71) Applicant: International Business Machines Corporation, Armonk, NY (US)

(72) Inventors: Sattwati Kundu, Bangalore (IN); Samiulla Zakir Hussain Shaikh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 17/463,673

(22) Filed: Sep. 1, 2021

(65) Prior Publication Data

US 2023/0068513 A1  Mar. 2, 2023

(51) Int. Cl.
*G06N 20/00* (2019.01)
*G06N 5/02* (2023.01)

(52) U.S. Cl.
CPC ............ *G06N 20/00* (2019.01); *G06N 5/02* (2013.01)

(58) Field of Classification Search
CPC ................................ G06N 20/00; G06N 5/02
See application file for complete search history.

(56) References Cited

U.S. PATENT DOCUMENTS

| | | | |
|---|---|---|---|
| 9,009,013 B2 | 4/2015 | Krainz | |
| 10,650,928 B1 | 5/2020 | Larson | |
| 11,030,086 B2* | 6/2021 | Tu | G06F 11/3692 |
| 11,341,367 B1* | 5/2022 | Barbosa | G06F 18/2148 |
| 12,072,918 B1* | 8/2024 | Newman | G06N 3/045 |
| 2016/0358099 A1 | 12/2016 | Sturlaugson | |
| 2018/0046926 A1* | 2/2018 | Achin | G06F 9/5011 |
| 2018/0060738 A1* | 3/2018 | Achin | G06N 20/00 |
| 2019/0172564 A1 | 6/2019 | Chandra | |
| 2020/0012593 A1 | 1/2020 | Maag | |
| 2020/0012933 A1* | 1/2020 | Truong | G06F 9/547 |
| 2020/0175390 A1* | 6/2020 | Conti | G06N 5/04 |
| 2020/0302234 A1* | 9/2020 | Walters | G06F 16/9035 |

(Continued)

OTHER PUBLICATIONS

Alvarez-Melis et al., "A causal framework for explaining the predictions of black-box sequence-to-sequence models", arXiv:1707.01943v3 [cs.LG] Nov. 14, 2017, 12 pages.

(Continued)

*Primary Examiner* — Barbara M Level
(74) *Attorney, Agent, or Firm* — Stephen R. Yoder

(57) ABSTRACT

Embodiments of the present invention provide computer-implemented methods, computer program products and computer systems. Embodiments of the present invention can, in response to receiving information, generate a data profile for a model that includes metadata for data requirements, model specific requirements, and data quality metrics. Embodiments of the present invention can generate one or more perturbations for training data associated with the received information and validate at least one perturbation of the one or more perturbations of training data as relevant test data based, at least in part on context associated with the model. Embodiments of the present invention can then generate one or more test scenarios based on the at least one validated perturbation and varying hyperparameters of the model and generate a test report based on an execution of at least one generated test scenario of the generated one or more test scenarios.

20 Claims, 4 Drawing Sheets

(56) References Cited

U.S. PATENT DOCUMENTS

| | | | | |
|---|---|---|---|---|
| 2020/0311611 A1* | 10/2020 | Kennedy | ............... | G06N 20/20 |
| 2020/0364618 A1* | 11/2020 | Peh | ................... | G06Q 10/0635 |
| 2023/0076795 A1* | 3/2023 | Indani | ................ | G06F 11/3688 |
| 2023/0214715 A1* | 7/2023 | Cheng | ..................... | G06N 7/01 |
| | | | | 706/12 |
| 2024/0104401 A1* | 3/2024 | Dembo | ............. | G06Q 10/0635 |

OTHER PUBLICATIONS

Dakkak et al., "MLModelscope: Evaluate and Measure ML Models Within AI Pipelines", arXiv:1811.09737v1 [cs.LG] Nov. 24, 2018, 13 pages.

Ribeiro et al., "Why Should I Trust You? Explaining the Predictions of Any Classifier", KDD 2016, DOI:http://dx.doi.org/10.1145/2939672.2939778, 10 pages.

Tamilselvam et al., "Dataset Creation for Deep-Learning Model", U.S. Appl. No. 16/798,757, filed Feb. 24, 2020, 34 pages.

Hans et al., "Domain Aware Explainable Anomaly and Drift Detection for Multi-Variate Raw Data Using a Constraint Repository", U.S. Appl. No. 16/585,664, filed Sep. 27, 2019, 33 pages.

Reddy et al., "Generating Explanations for Context Aware Sequence-to-Sequence Models", U.S. Appl. No. 16/783,534, filed Feb. 6, 2020, 27 pages.

* cited by examiner

TESTING MODELS IN DATA PIPELINE

BACKGROUND

The present invention relates in general to data pipelines, and more specifically artificial intelligence platforms supporting data pipelines.

Data cleaning or data cleansing is the process of detecting and correcting (or removing) corrupt or inaccurate records from a record set, table, or database and refers to identifying incomplete, incorrect, inaccurate or irrelevant parts of the data and then replacing, modifying, or deleting the dirty or course data. Data cleansing may be performed interactively with data wrangling tools. After cleansing, a data set should be consistent with other similar data sets in the system. The inconsistencies detected or removed may have been originally caused by user entry errors, by corruption in transmission or storage, or by different data dictionary definitions of similar entities in different stores. Data cleaning differs from data validation in that validation almost invariably means data is rejected from the system at entry and is performed at the time of entry, rather than on batches of data.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

In machine learning, a hyperparameter is a configuration that is external to the model and whose value cannot be estimated from data. Hyperparameters are used in processes to help estimate model parameters. Hyperparameter are set before the learning (e.g., training) process begins by contrast, the values of other parameters are derived via training. Different model training algorithms require different hyperparameters, some simple algorithms, such as least squares regression, require none. Given a set of hyperparameters, a training algorithm learns the parameter values from the data for instance, least absolute shrinkage and selection operator (LASSO) is an algorithm that adds a regularization hyperparameter to least squares regression, required to be set before estimating the parameters through the training algorithm. Similar machine learning models can require different hyperparameters (e.g., different constraints, weights, or learning rates) to generalize different data patterns.

Deep learning models are a type of machine learning model whose training is based upon learning data representations as opposed to task-specific learning. In other words, deep or machine learning is the ability of a computer to learn without being explicitly programmed to perform some function. Thus, machine learning allows a programmer to initially program an algorithm that can be used to predict responses to data, without having to explicitly program every response to every possible scenario that the computer may encounter. In other words, machine learning uses algorithms that the computer uses to learn from and make predictions with regard to data. Machine learning provides a mechanism that allows a programmer to program a computer for computing tasks where design and implementation of a specific algorithm that performs well is difficult or impossible. To implement machine learning, models or training datasets are created to train the machine-learning model. As the machine-learning model is presented with more and more data, the model is able to make predictions with respect to new data that the model has never digested or seen before.

SUMMARY

According to an aspect of the present invention, there is provided a computer-implemented method. The computer implemented method comprises: in response to receiving information, generating a data profile for a model that includes metadata for data requirements, model specific requirements, and data quality metrics; generating one or more perturbations for training data associated with the received information; validating at least one perturbation of the one or more perturbations of training data as relevant test data based, at least in part on context associated with the model; and generating one or more test scenarios based on the at least one validated perturbation and varying hyperparameters of the model; and generating a test report based on an execution of at least one generated test scenario of the generated one or more test scenarios.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize deficiencies of existing approaches to generate synthetic data for machine learning models by perturbing existing training data in a predetermined way. Specifically, embodiments of the present invention recognize that these approaches lack an ability or mechanism to determine the applicability of the perturbed data for specific use cases and domain specific constraints implied by generated models. Thus, current approaches use the generated data irrespective of appropriateness (i.e., correctness) to either augment or test the generated models. Embodiments of the present invention recognize that the amount of perturbed data left unverified for its respective applicability leads to erroneous evaluation of the generated models.

Embodiments of the present invention provide solutions for the deficiencies of existing approaches by considering characteristics of the perturbed data that is expected by generated models. In other words, embodiments of the present invention enhance AI platforms by generating and executing model specific test cases that consider the context the models are being used for. Thus, instead of using all data included in a training dataset, embodiments of the present invention can identify the aspects or dimensions of the dataset that do not have applicable (i.e., relevance) and uses only data that is applicable, thereby greatly reducing the amount of data that needed to assess a model. Thus, embodiments of the present invention require less processing resources and time than the conventional systems. The decrease in the amount of time and processing resources allows for generation of training dataset, respective test cases, and validation of models much more quickly than the conventional techniques. In this manner, embodiments of the present invention improve the quality of models loaded in these platforms in a more effective and efficient (e.g., requires less time) way to test the generated data. Specifically, embodiments of the present invention evaluate machine learning pipelines with probing test data while also traversing the subspace of model hyperparameters to generate a holistic evaluation report for the new model (e.g., the generated model) in the existing pipeline as discussed in greater detail later in this Specification.

Figure 1:
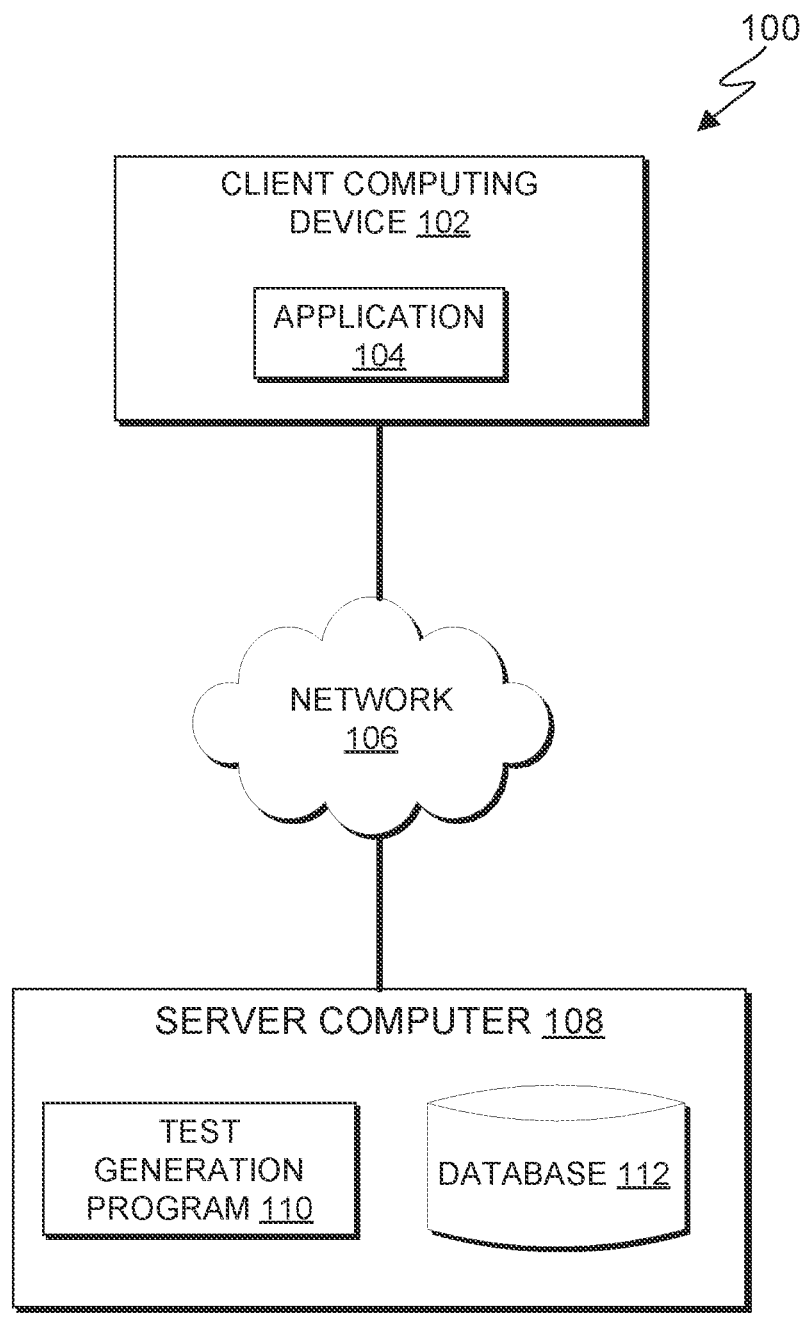
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access test generation program 110 (e.g., using TCP/IP) to access content, user information, and database information. Application 104 can further communicate with test generation program 110 to automatically test newly generated models in the context of an existing pipeline covering the input space and the parameter space of the model to expediate model deployment, as discussed in greater detail in FIGS. 2-3.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts test generation program 110 and database 112. In this embodiment, test generation program 110 resides on server computer 108. In other embodiments, test generation program 110 can have an instance of the program (not shown) stored locally on client computer device 102. In other embodiments, test generation program 110 can be a standalone program or system that checks generated data for validity with respect to context it is being used for and determine whether the perturbations are valid. In yet other embodiments, test generation program 110 can be stored on any number or computing devices.

In this embodiment, test generation program 110 functions on an artificial intelligence (AI) platform that supports end to end AI pipelines (e.g., cleaning data for training the model to deploying the trained model for end users). Test generation program 110 can, in some embodiments include a test data generation module (not shown) used in combination with a structured data generator (not shown), image generators (not shown), time series generations (not shown), text generators (not shown), and audio generates (not shown) that, when used in combination, can generate test case scenarios that checks the generated for its validity with respect to the context it is being used for and can determine whether the perturbations used are valid. Specifically, test generation program 110 can perform exhaustive testing on a given model (e.g., an AI model) in context of a pipeline covering the input space of the trained model and the parameter space of the training process. Test generation program 110 can also generate exhaustive, relevant test data (e.g., artificial test data that has been validated for context) for a machine learning model in context for a given AI pipeline. Finally, in some embodiments, test generation program 110 can sample representative model parameter sets that cover the parameter space in a meaningful way and accordingly train the representative models.

In an example, given a time-series model, test generation program 110 can identify that the pipeline using the time-series model defines periodicity and seasonality as constraints (i.e., important aspects) of the input data. Test generation program 110 can then focus on testing the effect of those factors (e.g., periodicity and seasonality) when testing the time-series model's performance. In this example, test generation program 110 identifies perturbations such as a data row containing country and state designations (e.g., country=USA, and State=Florida) as invalid artificial data. In this way, test generation program 110 can prevent using these data rows to test the model because these rows would not yield a good estimate of the quality of the model. In some embodiments, test generation program 110 can also target a generated model's parameter space as part of an automated test framework. In this manner, test generation program 110 can test and tune the model for the model's intended use within the AI pipeline.

Specifically, test generation program 110 can receive a request to validate perturbed data to be used in a given model. In this embodiment, test generation program 110 can check the model's metadata for data requirements and other model specific requirements. For example, test generation program 110 can access model constraints from a received model and perform parameter space sample to build model variants from parameter sampling.

In this embodiment, metadata for data requirements can be accessed by one or more knowledge graphs. A knowledge graph can include one or more enterprise products or solutions, with each product containing one or more models each having their respective metadata and requirements. A knowledge graph can also include training data, test data, payload data, and user inputs. Test generation program 110 can access the knowledge graph and generate a data profile for a respective pipeline and models within the respective pipeline.

Metadata generally refers to data associated with models (e.g., data requirements and other model specific requirements) and can also include quality metrics as well. For example, quality metrics accessed can include time information (e.g., duration of data), frequency of data (e.g., hourly, daily, etc.), seasonality (e.g., 24 hr, 48 hr, etc.), seasonality strength (e.g., on a scale from zero to one), and missing data.

Test generation program 110 can then check existing training data for various data quality metrics and subsequently update the knowledge graph with the quality data metrics test generation program 110 has identified. Test generation program 110 can then perturb the data (e.g., generate variations to original input data but have some samples that are either semantically valid or do not apply to the AI pipeline of the received model) and vary different model hyper parameters. Test generation program 110 can perform data validation by checking data quality, indexing data based on model metadata and indexing data based on user input.

Test generation program 110 can then create test scenarios with the perturbed data and varying model hyperparameters and subsequently execute the generated test cases. Test generation program 110 can then generate test reports based on the executed test cases. For example, test generation program 110 can include additional information such as the most influence parameter (e.g., the most sensitive learning rate), performance impact and particular learning rate.

Database 112 stores received information and can be representative of one or more databases that give permissioned access to test generation program 110 or publicly available databases. For example, database 112 can store received training data, test data, payload data, received user inputs as part of a respective data profile. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
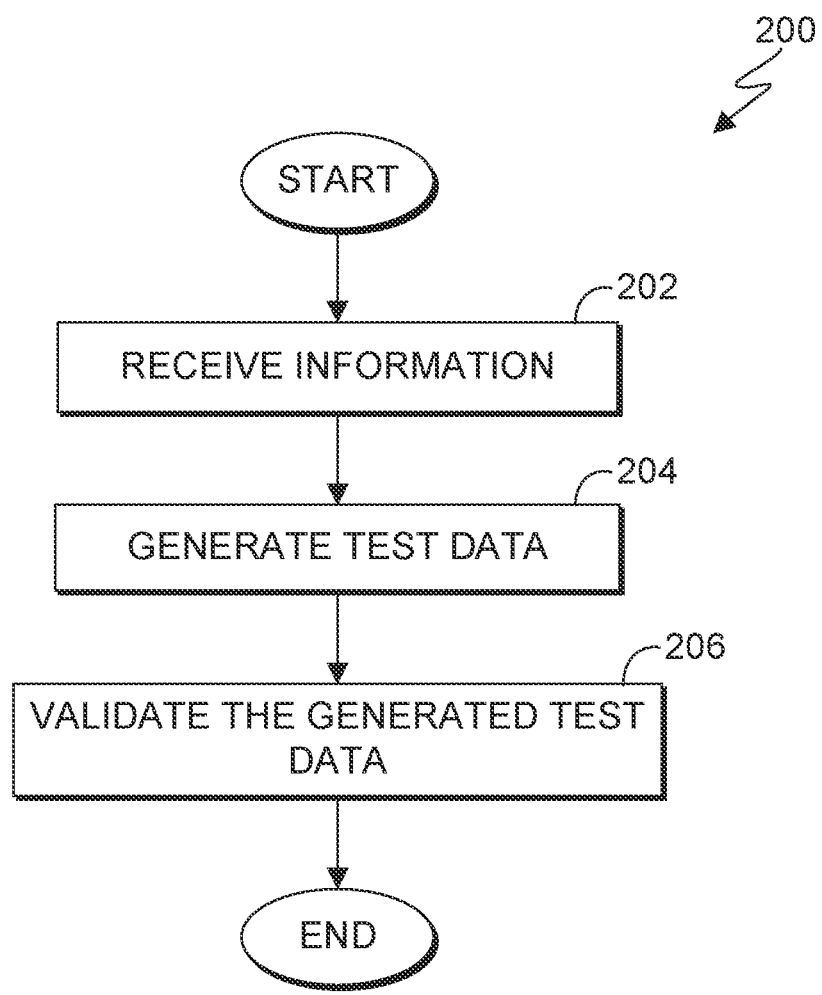
FIG. 2 is a flowchart depicting operational steps for testing a trained data model, in accordance with an embodiment of the present invention.

FIG. 2 is a flowchart 200 depicting operational steps for testing a trained data model, in accordance with an embodiment of the present invention.

In step 202, test generation program 110 receives information. In this embodiment, test generation program 110 receives information from client computing device 102. Information received can include a request to validate data for an AI model within a pipeline. The request can include additional information (e.g., metadata) such as training data, test data, payload data, and other user inputs. In other embodiments, test generation program 110 can otherwise access additional data (e.g., training data, test data, payload data, and other user inputs) stored in an existing knowledge graph in response to receiving a request. In yet other embodiments, test generation program 110 can receive information from one or more other components of computing environment 100.

Test generation program 110 can then use the received information to generate a data profile for a received model. The data profile includes the additional information as well as model specific information. For example, model information can include data requirements and other model specific requirements as well as quality metrics as well. For example, quality metrics accessed can include time information (e.g., duration of data), frequency of data (e.g., hourly, daily, etc.), seasonality (e.g., 24 hr, 48 hr, etc.), seasonality strength (e.g., on a scale from zero to one), and missing data. In other embodiments, test generation program 110 can check training data for data quality metrics. Test generation program 110 can then update the knowledge graph with the received information and model specific information.

In another embodiment, test generation program 110 can generate a data profile by dynamically selecting data points within a generated knowledge graph and constructing a data profile from the selected data points using the machine learning algorithm and an artificial intelligence algorithm. In an example, test generation program 110 retrieves a collection of interlinked descriptions, objects, events, or abstract concepts (e.g., documents) that indicate how a data profile would respond to a provided stimuli in a given scenario.

In step 204, test generation program 110 generates test data. In this embodiment, test generation program 110 generates test data by perturbing training data, test data, and payload data in the generated data profile. For example, test generation program 110 dynamically perturbs the data by introducing random changes to the training data, test data, and payload data according to metadata requirements, quality metrics, and other model specific requirements using at least one of a structured data generator module, text generator module, time series generator module, image generator module, and audio generator module. In this embodiment, test generation program 110 defines each perturbation as a random set of variables (e.g., insertion, deletion, arrangement, etc.) that prompts a reaction (i.e., adjustment to the data) from the generated data profile.

In step 206, test generation program 110 validates the generated test data. In this embodiment, test generation program 110 validates the generated test data by comparing the generated test data to the knowledge graph and respective data profile. In this manner, test generation program 110 can identify whether the generated test data satisfies quality metrics and context for which the model will be used for. For example, test generation program 110 identifies perturbations such as a data row containing country and state designations (e.g., country=USA, and State=Florida) as invalid artificial data. In this way, test generation program 110 can prevent using these data rows to test the model because these rows would not yield a good estimate of the quality of the model.

In another embodiment, test generation program 110 dynamically validates the tested data model by analyzing the plurality of perturbations for a plurality of indicative markers, determining an accuracy value for each perturbation based on a calculated metric for each perturbation, and indexing the plurality of perturbations based on the determined accuracy value for each perturbation. In this embodiment, test generation program 110 determines the accuracy value for each perturbation by calculating a measurement metric associated with the performance accuracy of the generated data profile. In this embodiment, test generation program 110 defines the measurement metric associated with the accuracy value as a derivation of inputting each perturbation into the trained data model. For example, test generation program 110 validates the generated data profile for user A by calculating a positive match percentage as the calculated metric. In this example, test generation program 110 calculates the positive match percentage by aggregating identified positive matches into a sum, wherein the positive match percentage is the percentage of positive matches of the plurality of indicative markers (i.e., business key incentive enhancers) associated with each perturbation and retrieved source information associated with the metadata of the data profile of the user. For example, test generation program 110 identifies salary bonuses, commission bonuses, and promotions as business key incentive enhancers within the plurality of indicative markers.

Test generation program 110 can then store the validated data as output. In this embodiment, test generation program 110 stores the validated data as output future testing of training data within an artificial intelligence pipeline. For example, test generation program 110 can store the validated data on database 112.

Figure 3:
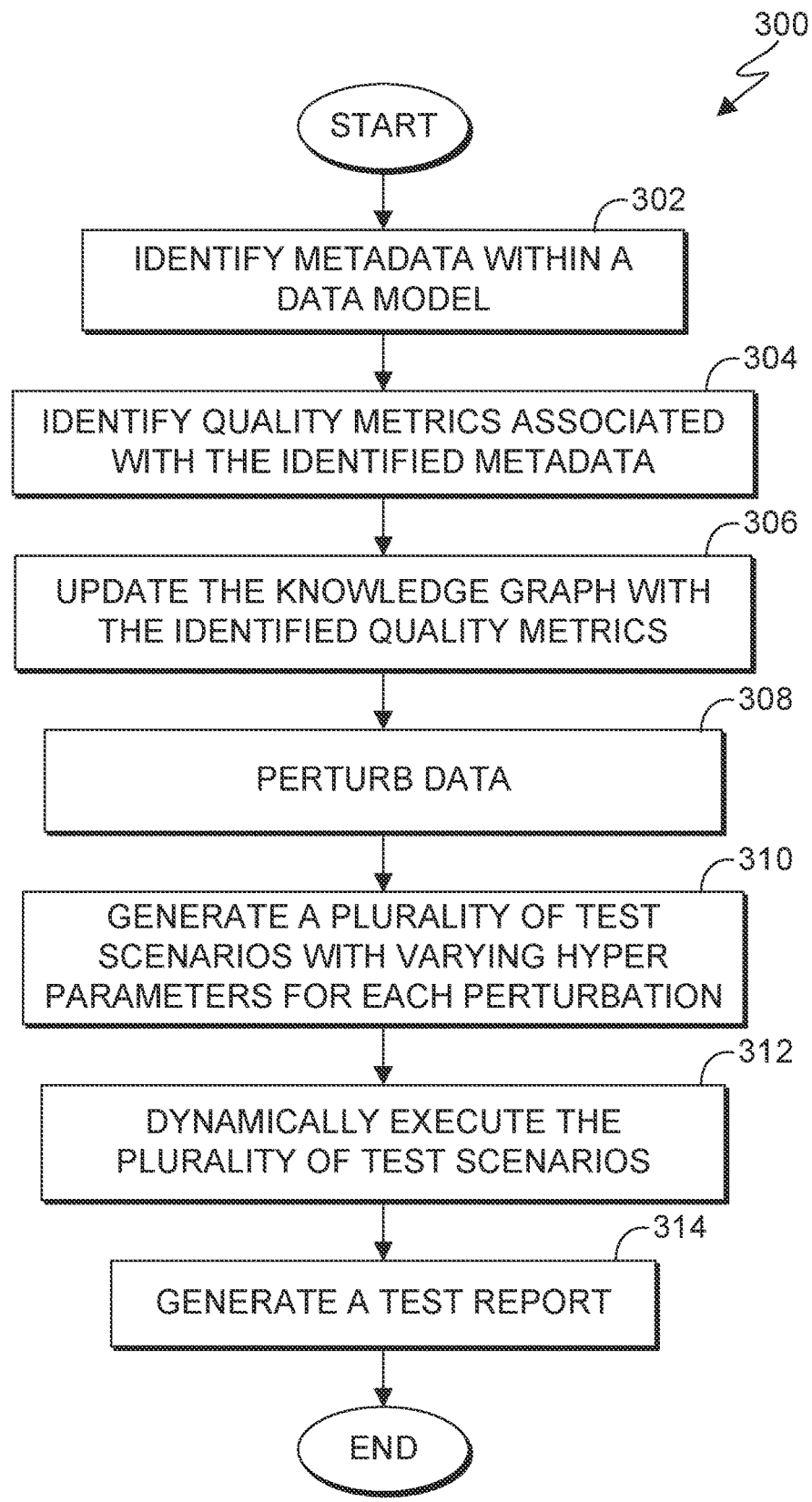
FIG. 3 is a flowchart depicting operational steps for generating a test report associated with a perturbed data model, in accordance with an embodiment of the present invention.

FIG. 3 is a flowchart 300 depicting operational steps for generating a test report associated with a perturbed data model, in accordance with an embodiment of the present invention.

In step 302, test generation program 110 identifies metadata within the trained data model. In this embodiment, test generation program 110 identifies metadata within the trained data model (i.e., model metadata) by analyzing the trained data model to identify metadata, data requirements, and model specific requirements using machine learning algorithms and artificial intelligence algorithms. In some circumstances, the data model may have been previously trained with an initial set of training data.

In step 304, test generation program 110 identifies quality metrics. In this embodiment, test generation program 110 identifies quality metrics from received or otherwise accessed training data. As mentioned earlier, quality metrics accessed can include time information (e.g., duration of data), frequency of data (e.g., hourly, daily, etc.), seasonality (e.g., 24 hr, 48 hr, etc.), seasonality strength (e.g., on a scale from zero to one), and missing data. In other embodiments, test generation program 110 can check training data for data quality metrics. Test generation program 110 can then update the knowledge graph with the received information and model specific information.

In step 306, test generation program 110 updates knowledge graph. In this embodiment, test generation program 110 updates the knowledge graph using the quality metrics found in the training data. For example, test generation program 110 incorporates the identified quality metrics by removing any data in the set of training data that fails to meet the identified quality metrics. In some embodiments, test generation program 110 can retrain the data model using the remaining training data, which generates a new set of training data. In another embodiment, test generation program 110 updates the generated knowledge graph associated with the data profile of the user.

In step 308, test generation program 110 perturbs the data. In this embodiment, test generation program 110 dynamically perturbs the data (e.g., training data, test data, payload data, and user inputs) by introducing random changes (e.g., insertions, deletions, manipulations, etc.) to the training data, test data, and payload data according to metadata requirements, quality metrics, and other model specific requirements. For example, test generation program 110 can dynamically perturb the training data by introducing structured data, image data, text data, audio data, and timeseries data to generate test data for each type of data within the generated data profile, where the generated data profile responds to the introduction of data differently depending on the type of test data introduced. Test generation program 110 can then validate the generated data (i.e., perturbed data) as previously described with respect to step 206 of flowchart 200. In some embodiments, test generation program 110 can retrain the model with the perturbed training data, validate the results, and store the retrained model.

In some embodiments, test generation program 110 can access model constraints and perform parameter space sampling to change hyperparameters of the model. Test generation program 110 can then generate model variants based on the parameter sampling. In other embodiments, test generation program 110 can vary hyperparameters of the model based on the perturbed training data.

In step 310, test generation program 110 generates a plurality of test scenarios with varying hyper parameters for the model and model variants using the perturbed data. In this embodiment, test generation program 110 generates the plurality of test scenarios (sometimes referred to as test cases) by analyzing the plurality of perturbations and building a specification of inputs, execution conditions, testing procedure, and expected results that define a test case to be executed to achieve a particular software testing objective (e.g., accuracy of the model, performance of the model under a set of constraints, etc.).

In step 312, test generation program 110 dynamically executes the plurality of test scenarios. In this embodiment, test generation program 110 dynamically executes the plurality of test scenarios by initiating the generated test scenarios with varying hyperparameters for the model and respective model variants. Test generation program 110 can then analyze results of the executed test scenarios and identify the changes in the metadata and knowledge graph associated with the generated data profile.

In step 314, test generation program 110 generates a test report. In this embodiment, test generation program 110 generates the test report by determining an accuracy value of performance of the model, identify the most influencing parameter in model quality (i.e., most sensitive to learning rate), performance impact and associated learning rate.

In another embodiment, test generation program 110 can determine an accuracy value of the performance of the model by calculating a measurement metric associated with the identified changes of the plurality of indicative markers of the generated data profile based on the application of the perturbations. For example, test generation program 110 determines the accuracy value for the generated data profile by calculating a match percentage as the calculated metric. In this example, test generation program 110 calculates the match percentage by aggregating identified positive matches into a sum, wherein the match percentage is the percentage of matches of the plurality of indicative markers (i.e., business key incentive enhancers) associated with each perturbation and retrieved source information associated with the metadata of the data profile of the user.

In some embodiments, test generation program 110 includes the calculated measurement metric, the accuracy value associated with the data model, and additional information on the perturbations applied to the trained data model within the test report. In another embodiment, test generation program 110 automatically inserts the validated data model into the machine learning data pipeline. In another embodiment, test generation program 110 deploys the validated model. For example, test generation program 110 dynamically classifies financial data in response to deploying the validated data model.

In another embodiment and in response to determining the accuracy value for each perturbed data model, test generation program 110 indexes the plurality of changes to the generated data profile and automatically selects at least one indexed change. In this embodiment, test generation program 110 indexes the plurality of changes to the generated data profile by ranking each change to the generated data profile based on an impact on the determined accuracy value. In this embodiment, the plurality of changes is used instead of the plurality of perturbations. In this embodiment and in response to ranking each change, test generation program 110 automatically selects the indexed change ranked at the highest priority based on the determined accuracy value. In this embodiment, test generation program 110 uses the selected change to generate a new data model for subsequent uses. Test generation program 110 can then rank each change to the generated data profile by ranking each change in a plurality of changes based on the impact to the calculated measurement metric, which indicates the impact of the change on the determined accuracy value. For example, test generation program 110 indexes the plurality of changes to the generated data profile by ranking each change based on the impact of the change to the positive match percentage between the plurality of indicative markers prior to the application of the perturbations and after the application of the perturbations.

Figure 4:
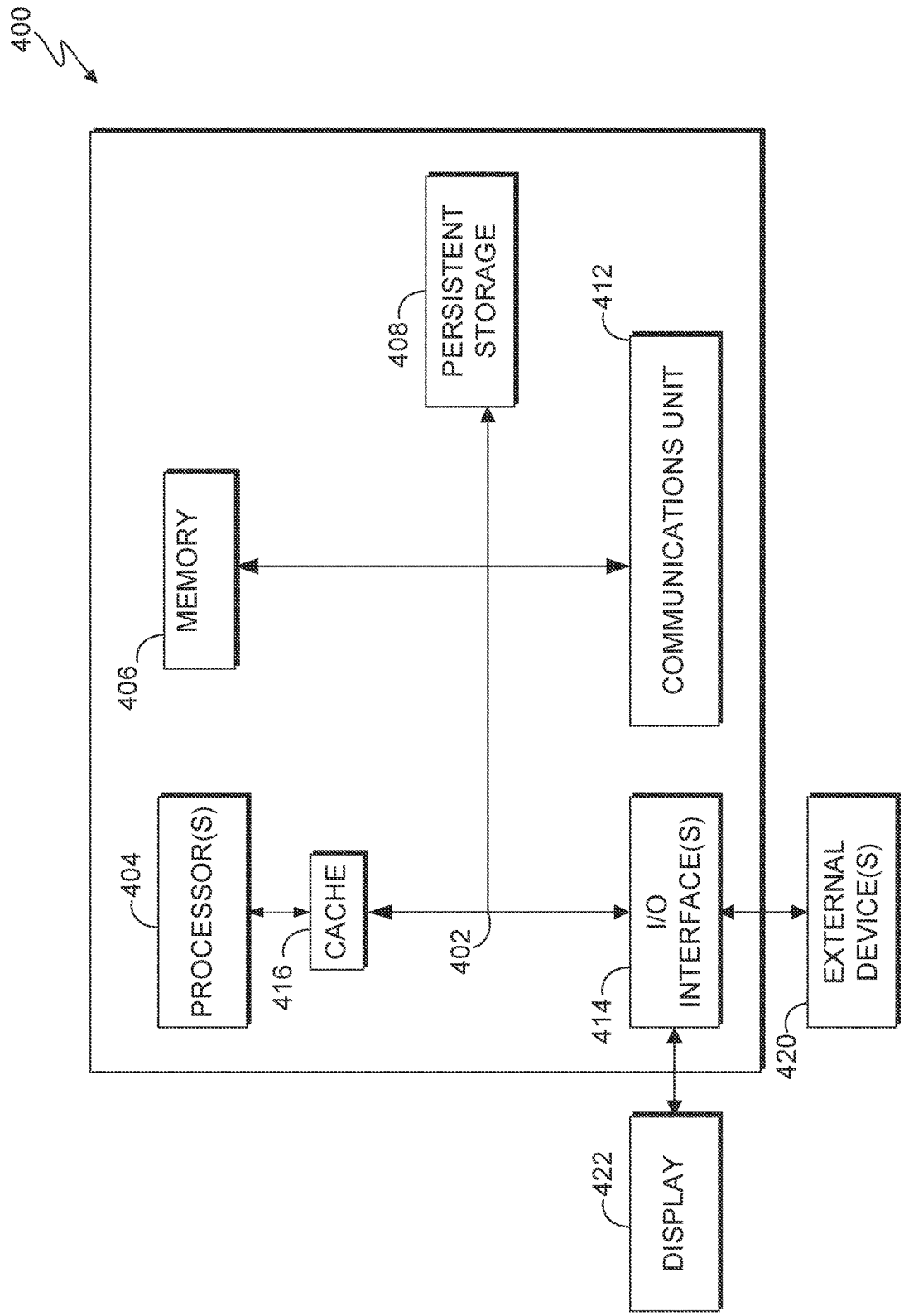
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Test generation program 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Test generation program 110 may be downloaded to persistent storage 408 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., test generation program 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in response to receiving a request to validate data for a new artificial intelligence (AI) model within an existing machine learning data pipeline, checking metadata of the new AI model for data requirements, model specific requirements, and data quality metrics;
   generating a data profile for the new AI model, the data profile including metadata associated with the AI model, the metadata including data quality metrics, training data, test data, and payload data;
   generating modified test data by perturbing the metadata in the data profile, the perturbing operating to introduce random changes to seasonality data of the data quality metrics to build model variants from parameter space sampling;

validating the modified test data as being relevant to a context of the existing pipeline covering the parameter space of the new AI model;

automatically generating one or more test scenarios using the modified test data and varying hyperparameters of the new AI model and the model variants;

executing the generated test scenarios;

determining an accuracy value of performance of the new AI model based on results of the executed test scenarios; and automatically inserting the new AI model into the existing data pipeline.

2. The computer-implemented method of claim 1, further comprising:

identifying constraints of the new AI model; and generating the model variants by performing parameter space sampling.

3. The computer-implemented method of claim 1, wherein the data quality metrics further include a minimum frequency of data.

4. The computer-implemented method of claim 1, further comprising:

updating a knowledge graph with the data quality metrics of the generated data profile for the new AI model as a part of the knowledge graph for the existing data pipeline.

5. The computer-implemented method of claim 1, further comprising:

generating a test report based on an execution of at least one generated test scenario of the generated one or more test scenarios;

wherein:

the generated test report includes an identification of a parameter that has a most sensitive learning rate, performance impacts of parameters included in a generated test scenario of the one or more generated test scenarios, and respective learning rates of each parameter.

6. The computer-implemented method of claim 4, further comprising:

identifying, by analyzing the results of the executed test scenarios, changes in the metadata and the knowledge graph associated with the data profile;

wherein determining the accuracy value includes:

calculating a measurement metric associated with the identified changes.

7. The computer-implemented method of claim 6, wherein the measurement metric is a match percentage, the match percentage being calculated by aggregating identified positive matches into a sum, wherein the match percentage is the percentage of matches of the results of the executed test scenarios with the generated data profile.

8. A computer program product comprising one or more computer-readable storage media having a set of instructions stored therein which, when executed by a processor, causes the processor to perform a method comprising:

in response to receiving a request to validate data for a new artificial intelligence (AI) model within an existing machine learning data pipeline, checking metadata of the new AI model for data requirements, model specific requirements, and data quality metrics;

generating a data profile for the new AI model, the data profile including metadata associated with the AI model, the metadata including data quality metrics, training data, test data, and payload data;

generating modified test data by perturbing the metadata in the data profile, the perturbing operating to introduce random changes to seasonality data of the data quality metrics to build model variants from parameter space sampling;

validating the modified test data as being relevant to a context of the existing pipeline covering the parameter space of the new AI model;

automatically generating one or more test scenarios using the modified test data and varying hyperparameters of the new AI model and the model variants;

executing the generated test scenarios;

determining an accuracy value of performance of the new AI model based on results of the executed test scenarios; and automatically inserting the new AI model into the existing data pipeline.

9. The computer program product of claim 8, wherein the instructions further cause the processor to perform a method comprising:

identifying constraints of the new AI model; and generating the model variants by performing parameter space sampling.

10. The computer program product of claim 8, wherein the data quality metrics further include a minimum frequency of data.

11. The computer program product of claim 8, wherein the instructions further cause the processor to perform a method comprising:

updating a knowledge graph with the quality metrics of the generated data profile for the new AI model as a part of the knowledge graph the existing data pipeline.

12. The computer program product of claim 8, wherein:

the instructions further cause the processor to perform a method comprising generating a test report based on an execution of at least one generated test scenario of the generated one or more test scenarios; and the generated test report includes an identification of a parameter that has a most sensitive learning rate, performance impacts of parameters included in a generated test scenario of the one or more generated test scenarios, and respective learning rates of each parameter.

13. The computer program product of claim 11, wherein the instructions further cause the processor to perform a method comprising:

identifying, by analyzing the results of the executed test scenarios, changes in the metadata and the knowledge graph associated with the data profile;

wherein determining the accuracy value includes:

calculating a measurement metric associated with the identified changes.

14. The computer program product of claim 13, wherein the measurement metric is a match percentage, the match percentage being calculated by aggregating identified positive matches into a sum, wherein the match percentage is the percentage of matches of the results of the executed test scenarios with the generated data profile.

15. A computer system comprising:

a processor set; and one or more computer-readable storage media;

wherein:

the processor set is structured, located, connected, or programmed to run program instruction stored on the one or more computer-readable storage media; and the instructions which, when executed by the processor set, cause the processor set to perform a method comprising:

in response to receiving a request to validate data for a new artificial intelligence (AI) model within an existing machine learning data pipeline, checking metadata of the new AI model for data requirements, model specific requirements, and data quality metrics;

generating a data profile for the new AI model, the data profile including metadata associated with the AI model, the metadata including data quality metrics, training data, test data, and payload data;

generating modified test data by perturbing the metadata in the data profile, the perturbing operating to introduce random changes to seasonality data of the data quality metrics to build model variants from parameter space sampling;

validating the modified test data as being relevant to a context of the existing pipeline covering the parameter space of the new AI model;

automatically generating one or more test scenarios using the modified test data and varying hyperparameters of the new AI model and the model variants;

executing the generated test scenarios;

determining an accuracy value of performance of the new AI model based on results of the executed test scenarios; and automatically inserting the new AI model into the existing data pipeline.

16. The computer system of claim 15, wherein the instructions further cause the processor set to perform a method comprising:

identifying constraints of the new AI model; and generating the model variants by performing parameter space sampling.

17. The computer system of claim 15, wherein the data quality metrics further include a minimum frequency of data.

18. The computer system of claim 15, wherein the instructions further cause the processor set to perform a method comprising:

updating a knowledge graph with the quality metrics of the generated data profile for the new AI model as a part of the knowledge graph the existing data pipeline.

19. The computer system of claim 18, wherein the instructions further cause the processor set to perform a method comprising:

identifying, by analyzing the results of the executed test scenarios, changes in the metadata and the knowledge graph associated with the data profile;

wherein determining the accuracy value includes:

calculating a measurement metric associated with the identified changes.

20. The computer system of claim 19, wherein the measurement metric is a match percentage, the match percentage being calculated by aggregating identified positive matches into a sum, wherein the match percentage is the percentage of matches of the results of the executed test scenarios with the generated data profile.

* * * * *